July 11, 1967

C. A. COOK 3,329,999

INTERNAL AIR RING

Filed Aug. 16, 1965

INVENTOR
CHARLES A. COOK

BY Allen A. Meyer, Jr.
ATTORNEY

July 11, 1967   C. A. COOK   3,329,999
INTERNAL AIR RING
Filed Aug. 16, 1965   2 Sheets-Sheet 2

INVENTOR
CHARLES A. COOK
BY Allen A. Meyer, Jr.
ATTORNEY

United States Patent Office 3,329,999
Patented July 11, 1967

3,329,999
INTERNAL AIR RING
Charles Alexander Cook, Terre Haute, Ind., assignor to National Distillers and Chemical Corporation, New York, N.Y., a corporation of Virginia
Filed Aug. 16, 1965, Ser. No. 479,890
4 Claims. (Cl. 18—14)

This invention relates to method and apparatus for producing tubular films from thermoplastic materials by extrusion processes. More particularly, the invention relates to novel tube forming and cooling procedures whereby improved films having greater strength and other improved characteristics may be produced at higher rates of extrusion than heretofore has been possible.

It is known in the prior art to produce so-called blown tubular films of the character with which we here are concerned by extruding molten thermoplastic materials (exemplified by polyethylene, polypropylene, and other polyolefins) through circular die structure, the extruded film being drawn from the die lips by nip rolls mounted above and at a location remote from the die orifice. The tube thus formed is then inflated by the introduction of pressurized air, thereby expanding the tube through the formation of an "air bubble" of appropriate dimension whereby desired tube diameter and film gauge or thickness is achieved. The expanded tube then is passed through an annular cooling zone wherein a stream of suitable gaseous heat exchange medium, such as air, or the like, is directed against the outer surface of the moving tube.

It should be understood that the extruded tube, as drawn from the die, remains in a substantially molten state for some distance beyond the die orifice and is susceptible to distortion under internal air pressure, to rupture at high nip rolls speeds, and to relatively low heat transfer rates, particularly at such higher speeds. Further, as the velocities of extrusion and "drawn down" are increased, and the external cooling also increased to compensating levels, the increased velocity of the stream (streams) of gaseous cooling medium on the unoriented tubular material tends to produce fluttering and distortion in the film, resulting in the rupture thereof.

It also should be understood that the external cooling of the film, by impingement of gaseous streams, produces a skin or crust and that continued cooling through the tubular walls is by conduction.

It is a major object of the present invention to provide novel apparatus whereby molten thermoplastic materials may be extruded to form blown tubular films and wherein the pressurized air utilized to create the internal bubble is both cooled and recirculated, simultaneously with the external cooling of the tubular film.

It is a further object of the invention to provide apparatus whereby molten thermoplastic materials may be extruded to form blown tubular films at extrusion rates which are not substantially limited by the application of high pressure streams of a gaseous heat exchange medium over the outer surface of the tubular film.

It is a still further object of the invention to provide novel apparatus of the class set forth wherein molten thermoplastic material extruded as a blown tubular film may be expanded to finished product and diameter in a zone immediately following and in close proximity to the die orifice.

It is a still further object of the present invention to provide novel apparatus whereby molten thermoplastic materials may be extruded to form blown tubular films having uniform internal and external surface characteristics, created through the simultaneous cooling, under equalized pressures, of the respective surfaces, whereby improved film characteristics including greater strength are obtained.

A still further object of the invention is to provide a novel method for the production of blown tubular film, from thermoplastic materials, of the character with which we here are concerned.

Further objects and advantages of the invention will be readily apparent from the following description, taken in conjunction with the accompanying drawings, wherein.

Figure 1:
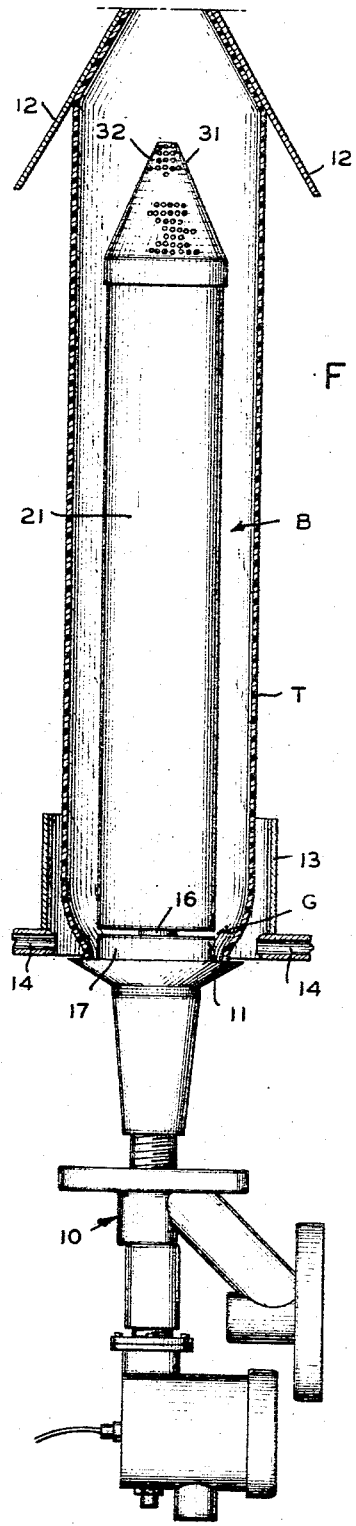
FIGURE 1 is an elevational view, partly in section, illustrating apparatus in accordance with the present invention in association with a mandrel type die structure for producing blown tubular films.

As shown in the drawings, particular reference being had to FIGURE 1, conventional extrusion apparatus 10, illustrated somewhat diagrammatically, having die structure 11 including a circular die orifice (not shown), may be employed, the extruded thermoplastic tube T being drawn upwardly from the die to a point of contact with collapsing structure such as the shield 12 beyond which the flattened tube may pass between opposed chill structure prior to engagement between a pair of nip rolls or the like (not shown) beyond which the tube is drawn down or conveyed to a suitable wind-up roll, all this being well known in the art and requiring no particular discussion here. Immediately beyond the die orifice the extruded tube passes through a venturi-type throat or chimney 13 which constitutes an external cooling ring, a suitable cooling fluid (air) under pressure from an appropriate source (not shown) being directed against the moving tube through a plurality of axially spaced passages or inlets 14. Simultaneously, air pressure provided within the extruded tube T creates a bubble B, extending from the die orifice to the point of tube collapsing at the nip rolls, and it is within this bubble that the novel internal cooling ring which is the subject matter of the present invention is received.

The extrusion die is provided with a centrally located relief hole through which tubular conduit means 15 projects, said conduit means being mounted within an externally threaded bushing 16 secured within an insulating ring 17 seated directly upon the die face. If desired, the ring 17 may be laminated, having a lower strata or layer of asbestos and an intermediate section produced from wood, or the like, to provide a partial heat barrier between the extrusion die and the internal cooling structure. In the embodiment illustrated, the lower face of the insulating ring 17 is recessed as shown at 18 to provide an air pocket. The upper face of the ring 17 also is recessed, as shown at 19, the peripheral wall 20 of this recess preferably being upwardly and outwardly inclined for a purpose to be discussed more fully hereinafter.

Figure 2:
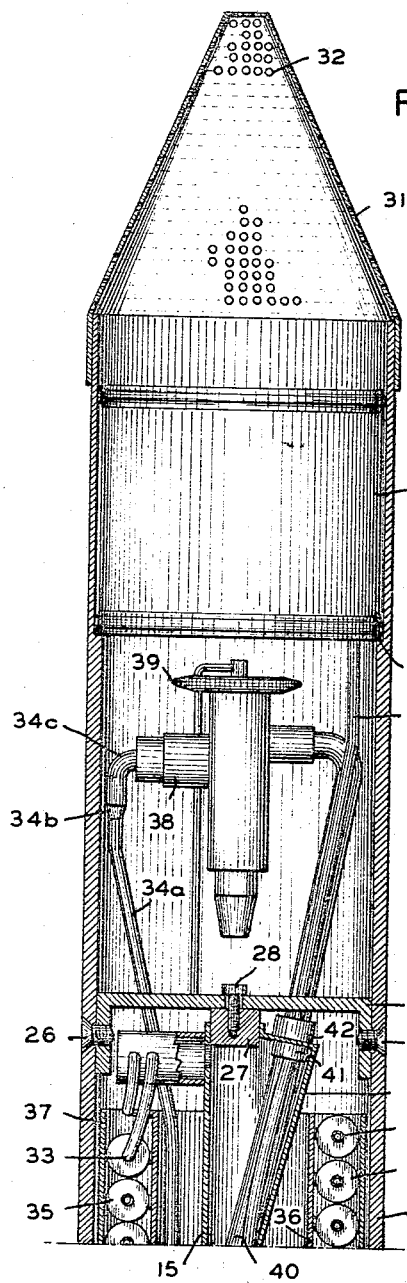
FIGURE 2 is a vertical sectional view, on an enlarged scale, of the upper portion of the internal air ring assembly.
Figure 3:
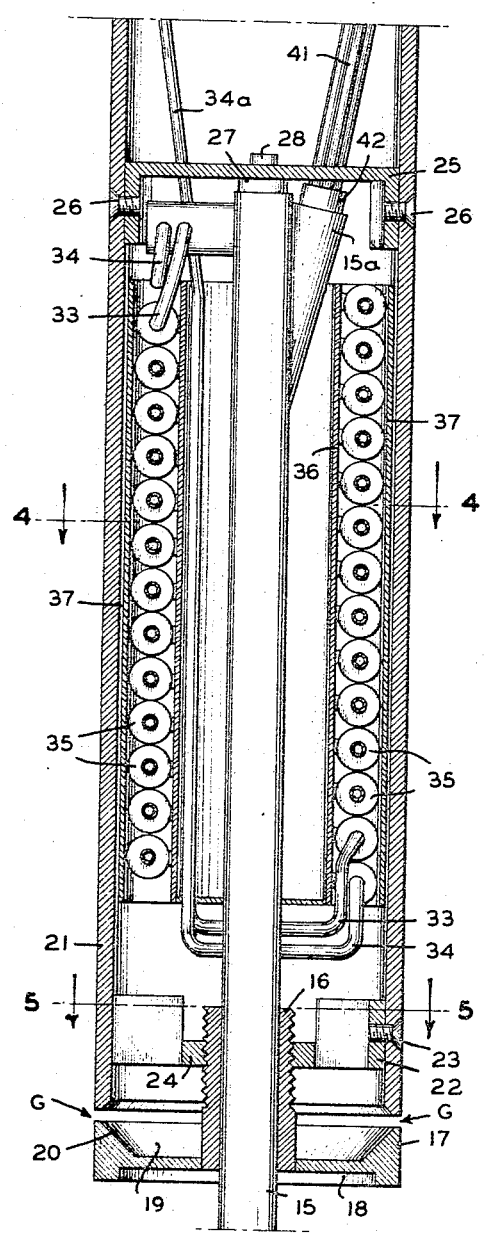
FIGURE 3 is a vertical sectional view, on a similarly enlarged scale and complementary to FIGURE 2, illustrating the lower portion of the internal air ring assembly.

The internal air ring assembly desirably is received within a tubular housing 21 and is mounted directly upon the bushing 16. As shown more particularly in FIGURE 3 of the drawings, a spider 22 is mounted within the housing or air ring body 21 adjacent the lower extremity thereof, machine screws 23 or the like being employed to secure the spider in position. The hub portion 24 of the spider 22 is internally threaded for engagement with the external threads of the bushing 16 thereby permitting vertical adjustment of the air ring body to provide an appropriate gap G between the lower extremity of the air ring assembly and the upper peripheral edge of the insulating ring 17. In practice, a gap width on the order of ⅜″ is particularly effective. A transverse brace or bracket 25 is secured within the body 21, at a point remote from the spider 22, as by machine screws or the like 26, and suitable means is provided for attaching the upper extremity of the conduit 15 to the brace 25. As illustrated more particularly in FIGURE 2 of the drawings, a closure plug 27 is secured within the conduit 15, so as to project or extend thereabove and a threaded bolt or the like 28, passing through a centrally located aperture in the brace 25 and having threaded engagement with the closure plug 27, may be employed to securely mount the air ring assembly in accurate vertical alignment.

Adjacent the upper extremity of the air ring assembly, within the tubular body 21 and at a point spaced from the brace 25, an axivane fan assembly 29 is mounted in any desired manner. As illustrated (see FIGURE 2) the fan housing fits snugly within the body 21 and a peripheral shoulder 30 may be provided, the fan housing seating upon the shoulder 30, there being appropriate provision to guard against vibratory movement of the fan assembly.

Desirably, the upper extremity of the air ring assembly is closed by a nose cone 31, the tapered surface thereof being provided with a multiplicity of closely spaced apertures 32 to permit uniform dispersion of fluid (air) passing therethrough under operative conditions.

Figure 4:
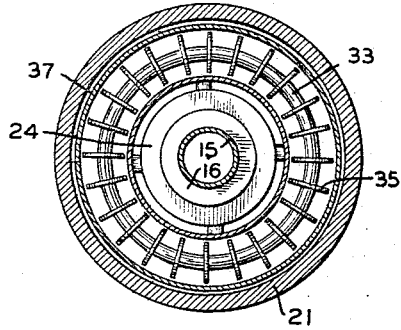
FIGURE 4 is a transverse sectional view, taken on the line 4—4 of FIGURE 3, illustrating the cooling coils.
Figure 5:
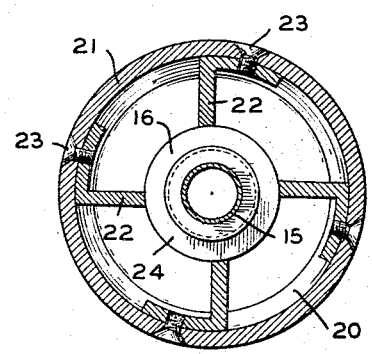
FIGURE 5 is a transverse sectional view taken on the line 5—5 of FIGURE 3, illustrating details of the internal air ring assembly mounting structure.

The lower portion of the air ring body constitutes a cooling coil section and suitable means is mounted therein to effectively cool or refrigerate the fluid medium (air) received within the bubble B. In the embodiment illustrated (see FIGURES 3 and 4 of the drawings) two helical tubular coils 33 and 34 are provided, these coils being provided with fins 35 and intended for the reception of suitable refrigerant, such as "Freon," as is well known in the art. Desirably, the cooling coils are mounted between a baffle 36, constituted by the wall of an inner can element, and an outer sleeve 37.

A complete conventional refrigeration system is provided, including compressor, condenser and pressure indicators (not shown), and the coil 34 includes a vertically directed extension 34a having direct connection through the reducer 34b and elbow 34c of enlarged diameter with the distributor 38. A thermoplastic valve indicated at 39 is mounted immediately above the distributor assembly for automatic control of cooling. Thus, in operation, the temperature of the fluid within the bubble B may be maintained at any level desired, particular consideration being given to the extrusion rate.

Electric energy is supplied to the axivane motor assembly 29 from any suitable source (not shown) through the conduit 40 to the receptacle 41 mounted within an offset portion 15a at the upper extremity of the conduit 15. A conventional plug 42 is provided, for engagement with the receptacle 41, and a conduit 43 carries the electric wiring to the fan motor 29. It will be understood that the conduit 15 has direct connection with a centrally located bore or access hole extending through the die and that this bore is of sufficient diameter to accommodate electrical wiring as well as Freon liquid and suction lines.

The axivane fan provides controlled circulation of the cooled or refrigerated air within the bubble B, it being understood that the flow of fluid is downwardly through the tubular housing 21, air being drawn into the nose cone 31 through the apertures 32 and refrigerated by passage over the cooling coils 33 and 34. The orifice or gap G between the lower extremity of the tubular housing 21 and the upper peripheral edge of the insulating ring 17 is located substantially in direct alignment with the inlets 14 of the external air cooling ring; thus, the force of external air impingement is repelled or balanced by internal air pressure, the angularly and upwardly directed peripheral wall 20 of the recess 19 in the upper surface of the insulating ring 17 serving to direct the refrigerated air at the point of initiation of the upward movement thereof.

In accordance with prior art teachings, with external cooling only, the outer surface of the extruded tubular film formed a skin and thus was oriented and the inner surface of the tube was cooled by conduction through the film. With simultaneous cooling both interiorly and exteriorly, an oriented skin is formed on each side of the film and a tube of substantially higher strength is created.

Heretofore, again in accordance with prior art teachings, the maximum air output of the external cooling ring was determined by the collapsing point of the bubble which, immediately adjacent the die mouth, was in substantially molten condition.

With the process of the present invention, a much higher pressure may be applied exteriorly due to the bubble support provided interiorly; thus, a substantially higher overall strength (tear, elongation, modulus, etc.), with much greater extrusion rates, is obtained through the orientation of both exterior and interior surfaces as the bubble is blown.

Tests made to determine the effect of the internal air cooling ring of the present invention insofar as film strength and extrusion speed, may be detailed as follows:

With internal air cooling supplied by a 3-ton Copeland compressor, utilizing Freon 12, the line was brought up and stabilized for one-half hour at 380 lbs./hr. output and seven (7) mil samples were taken. The output then was increased to 409 lbs./hr. and ten (10) mil samples were taken. From these 7-mil and 10-mil samples, heavy duty bags were produced. These bags then were compared with similar 7-mil and 10-mil bags produced from identical resin and utilizing a conventional external cooling ring and external chill train collapsing leading toward the nip rolls.

These tests disclosed that, with use of the internal air ring cooling there was an increase of 10% in film strength with a 10% increase of maximum output to 430 lbs./hr.

Further tests were made, as illustrated by the following tabulation:

|  | Chill Train | Internal Air Ring | | |
| --- | --- | --- | --- | --- |
|  | 10 Mil | 10 Mil [1] | 10 Mil [2] | 10 Mil [3] |
| Tensile: | | | | |
| M.D., p.s.i. | 2,585 | 2,886 | 2,989 | 2,785 |
| T.D., p.s.i. | 2,280 | 2,696 | 2,630 | 2,590 |
| Elong: | | | | |
| M.D., percent | 400 | 506 | 513 | 527 |
| T.D., percent | 485 | 640 | 631 | 626 |
| Elm. Tear: | | | | |
| M.D., gms./mil | 52.5 | 65.9 | 62.9 | 57.4 |
| T.D., gms./mil | 102.9 | 107.9 | 114.3 | 57.8 |

[1] Mach. speed 409 lbs./hr. Resin-Lot 34524.
[2] Mach. speed 409 lbs./hr. Resin-Lot 36829.
[3] Mach. speed 409 lbs./hr. Resin-Lot 36829—80 hour freeze.

These tests disclosed:

(1) Internal air ring material was superior in strength to normal chill train production.

(2) Internal air ring material increased strength characteristics in excess of 10% and production rates in excess of 6%.

(3) Ease of opening (slip characteristics) of air ring material was superior.

There has thus been described a novel method and apparatus for producing extruded tubular films, from thermoplastic materials, having vastly improved characteristics and at substantially higher rates of extrusion. It will be understood that various changes may be made in the invention without departing from the spirit and scope thereof and reference therefore is had to the claims for summaries of the essentials of the invention and of the novel features of construction, novel combinations of parts, and novel process taught herein, for all of which protection is desired.

What is claimed is:

1. Apparatus for forming tubular films of molten thermoplastic materials, comprising, in combination with a die defining an annular orifice and means for introducing a gaseous heat exchange medium into said tubular film to provide a bubble, a venturi-type throat located immediately adjacent the die orifice and means to draw said tubular film through said throat, means within said throat constituting an external cooling ring for directing a gaseous heat exchange medium against the exterior of said tubular film to cool the same, an internal cooling ring assembly mounted within said bubble upon a tubular conduit communicating with a centrally located aperture in said die, said internal cooling ring assembly including a vertically adjustable tubular housing open at the lower extremity thereof and mounted in closely spaced relation with respect to an insulating ring mounted immediately above the face of said die to provide an annular gap located in substantial alignment with the external cooling ring, the upper face of said insulating ring being provided with a recess having an upwardly and outwardly inclined peripheral wall whereby a gaseous heat exchange medium is directed upwardly against the inner wall of said tubular film in direct alignment with passage of gaseous heat exchange medium from said external cooling ring, refrigerating coils within said housing, and means for supplying refrigerant to said coils, the tubular housing of said internal cooling ring assembly extending substantially the entire height of said bubble and having a tapered upper extremity provided with a plurality of inlet apertures, and fan means within said housing located adjacent the upper extremity thereof for circulating the gaseous heat exchange medium within said bubble downwardly through said tubular housing and over said refrigerating coils and through said gap against the interior surface of said tubular film.

2. Apparatus as set forth in claim 1 where gaseous heat exchange medium, refrigerant for said coils, and electrical wiring for said fan, are carried within the tubular conduit upon which said tubular housing is supported.

3. Apparatus as set forth in claim 1 where the upper extremity of said tubular housing is provided with a nose cone, the tapered surface of said cone being provided with a multiplicity of closely spaced apertures to permit uniform entry of the gaseous heat exchange medium into said housing.

4. Apparatus as set forth in claim 1 where an insulating ring is mounted upon the die face and said annular gap is constituted by the spacing between the lower extremity of said tubular housing and the upper peripheral edge of said insulating ring.

References Cited

UNITED STATES PATENTS

| | | | |
|---|---|---|---|
| 2,844,846 | 7/1958 | Kronholm | 18—14 |
| 3,074,108 | 1/1963 | Wiley | 18—14 |
| 3,167,814 | 2/1965 | Corbett | 18—14 |
| 3,170,011 | 2/1965 | Cheney et al. | |
| 3,172,930 | 3/1965 | Johnson et al. | 18—14 X |
| 3,226,459 | 12/1965 | Tijunelis | 18—14 X |

FOREIGN PATENTS

| | | |
|---|---|---|
| 828,851 | 2/1960 | Great Britain. |

WILLIAM J. STEPHENSON, *Primary Examiner.*